(12) United States Patent
Darmour et al.

(10) Patent No.: US 12,099,668 B2
(45) Date of Patent: Sep. 24, 2024

(54) DYNAMIC USER INTERFACE MODE SELECTION BASED ON PHYSICAL ACTIVITY DETECTION

(71) Applicant: Oracle International Corporation, Redwood Shores, CA (US)

(72) Inventors: Jennifer Darmour, Seattle, WA (US); Adam Samuel Riddle, Seattle, WA (US); Loretta Marie Grande, Seattle, WA (US); Diego Pantoja-Navajas, Boca Raton, FL (US); Roberto Espinosa, Atlanta, GA (US); Arunachalam Murugan, Marietta, GA (US)

(73) Assignee: Oracle International Corporation, Redwood Shores, CA (US)

( * ) Notice: Subject to any disclaimer, the term of this patent is extended or adjusted under 35 U.S.C. 154(b) by 327 days.

(21) Appl. No.: 17/318,042

(22) Filed: May 12, 2021

(65) Prior Publication Data

US 2022/0091681 A1    Mar. 24, 2022

Related U.S. Application Data

(60) Provisional application No. 63/080,410, filed on Sep. 18, 2020.

(51) Int. Cl.
| | | |
|---|---|---|
| *G06F 3/0346* | (2013.01) | |
| *G06F 3/01* | (2006.01) | |
| *G06F 3/038* | (2013.01) | |
| *G06N 3/08* | (2023.01) | |
| *H04N 23/60* | (2023.01) | |
| *G06F 18/214* | (2023.01) | |

(Continued)

(52) U.S. Cl.
CPC .............. *G06F 3/038* (2013.01); *G06F 3/017* (2013.01); *G06F 3/0346* (2013.01); *G06N 3/08* (2013.01); *H04N 23/60* (2023.01); *G06F 18/2148* (2023.01); *G06F 2203/0381* (2013.01); *G06V 10/462* (2022.01); *G06V 10/751* (2022.01); *G06V 40/13* (2022.01)

(58) Field of Classification Search
CPC ........ G06F 3/038; G06F 3/017; G06F 3/0346; G06F 18/2148; G06F 2203/0381
See application file for complete search history.

(56) References Cited

U.S. PATENT DOCUMENTS

2009/0249428 A1*  10/2009  White ................ H04N 21/4131
                                                        725/133
2014/0167973 A1*  6/2014  Letchner ............ G06Q 30/0245
                                                        340/870.02

(Continued)

*Primary Examiner* — Nhat Huy T Nguyen
(74) *Attorney, Agent, or Firm* — Invoke

(57) ABSTRACT

Techniques for improving the convenience of activating different computing applications on a mobile computing device are disclosed. Sensors associated with a mobile computing device (e.g., accelerometers, gyroscopes, light sensors, microphones, image capture sensors) may receive inputs of various physical conditions to which the mobile computing device is being subjected. Based on one or more of these inputs, the mobile computing device may automatically select a content presentation mode that is likely to improve the consumption of the content by the user. In other embodiments, image analysis may be used to access different mobile computing applications.

22 Claims, 9 Drawing Sheets

(51) Int. Cl.
  *G06V 10/46*   (2022.01)
  *G06V 10/75*   (2022.01)
  *G06V 40/13*   (2022.01)

(56) References Cited

U.S. PATENT DOCUMENTS

| | | | | |
|---|---|---|---|---|
| 2015/0186110 A1* | 7/2015 | Kannan | ............... | G06F 3/167 |
| | | | | 715/728 |
| 2015/0269409 A1* | 9/2015 | Weber | ............... | G06F 1/169 |
| | | | | 382/125 |
| 2015/0371520 A1* | 12/2015 | DeLean | ............ | G06V 40/103 |
| | | | | 382/103 |

* cited by examiner

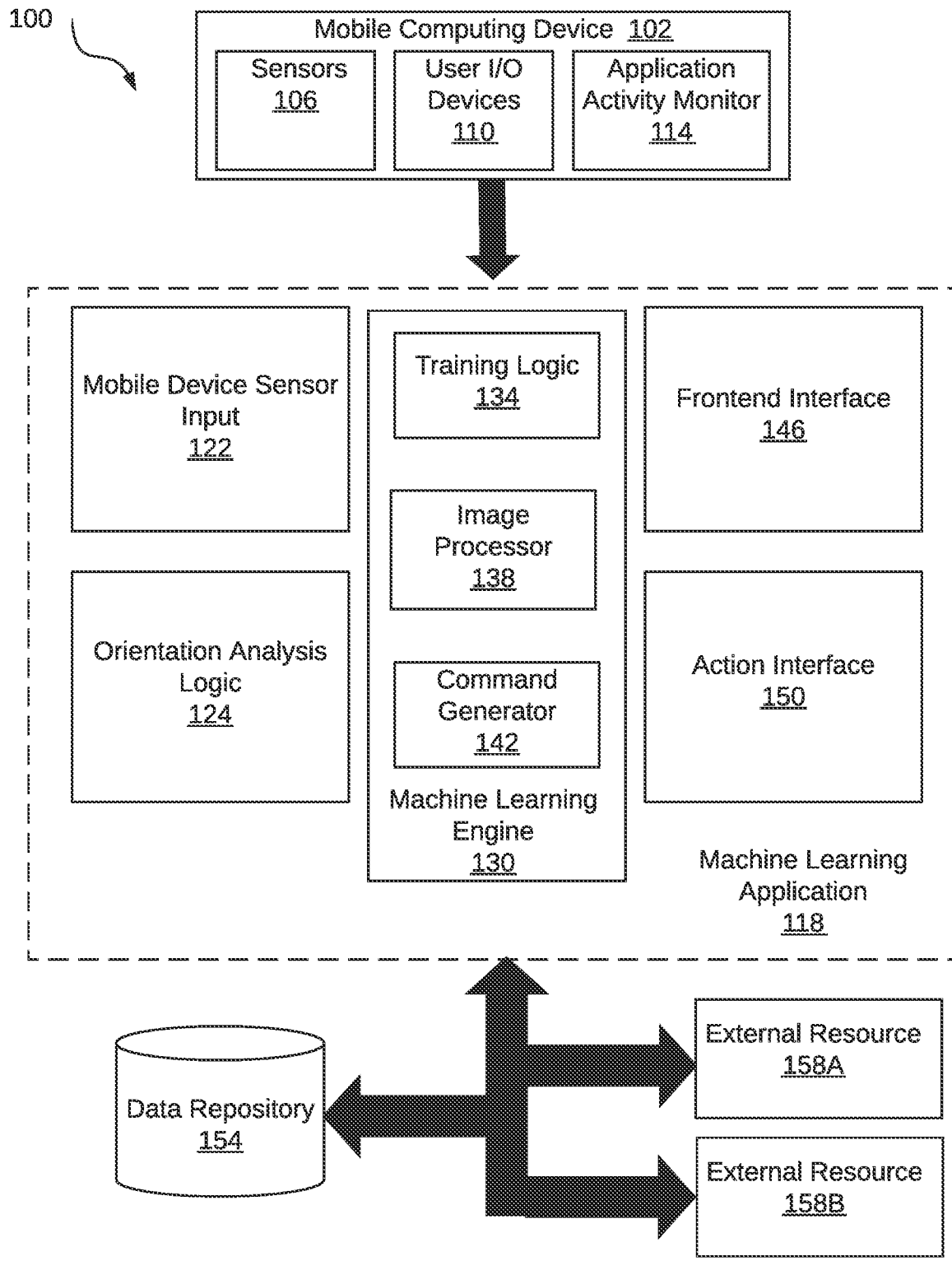

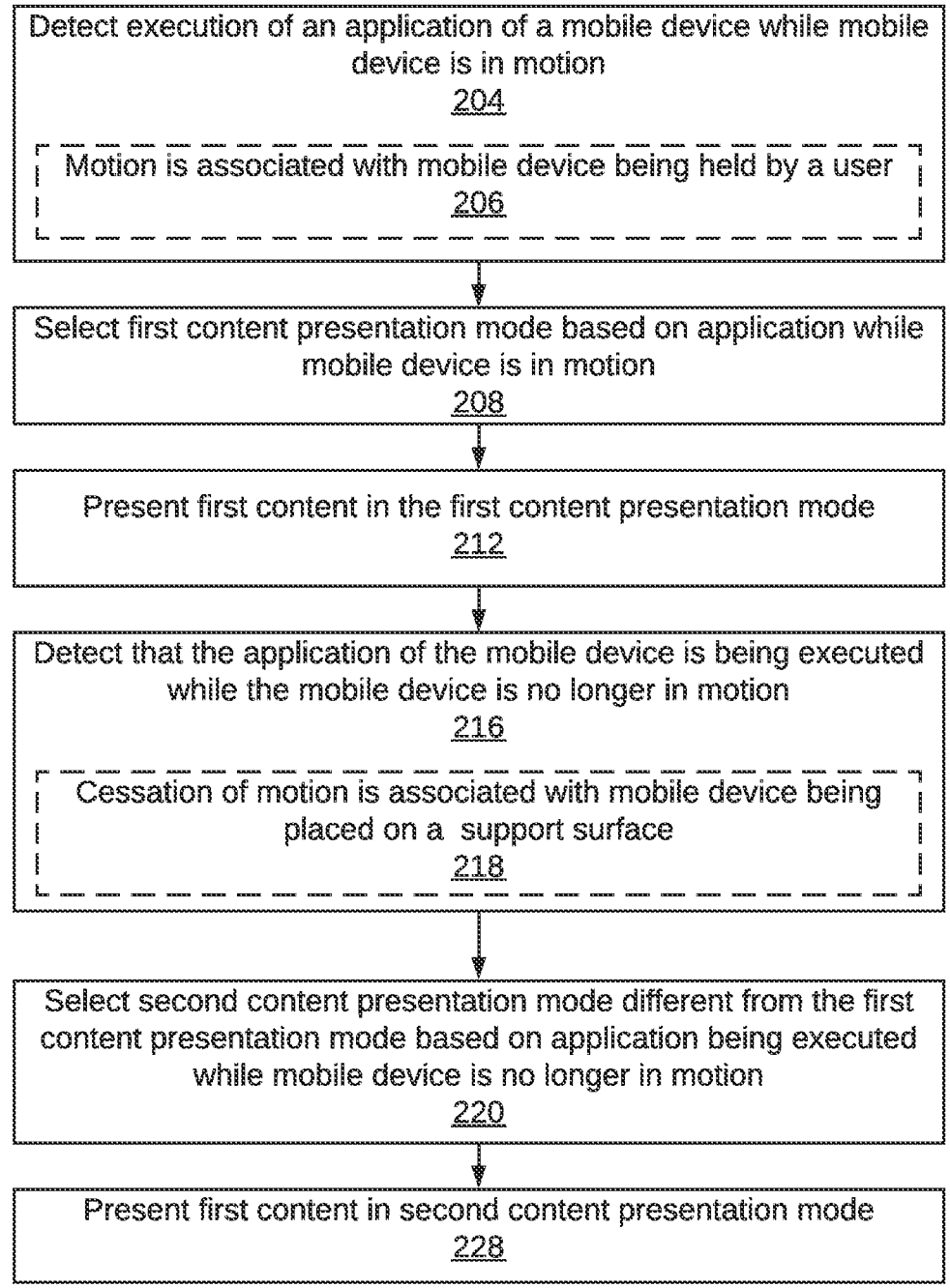

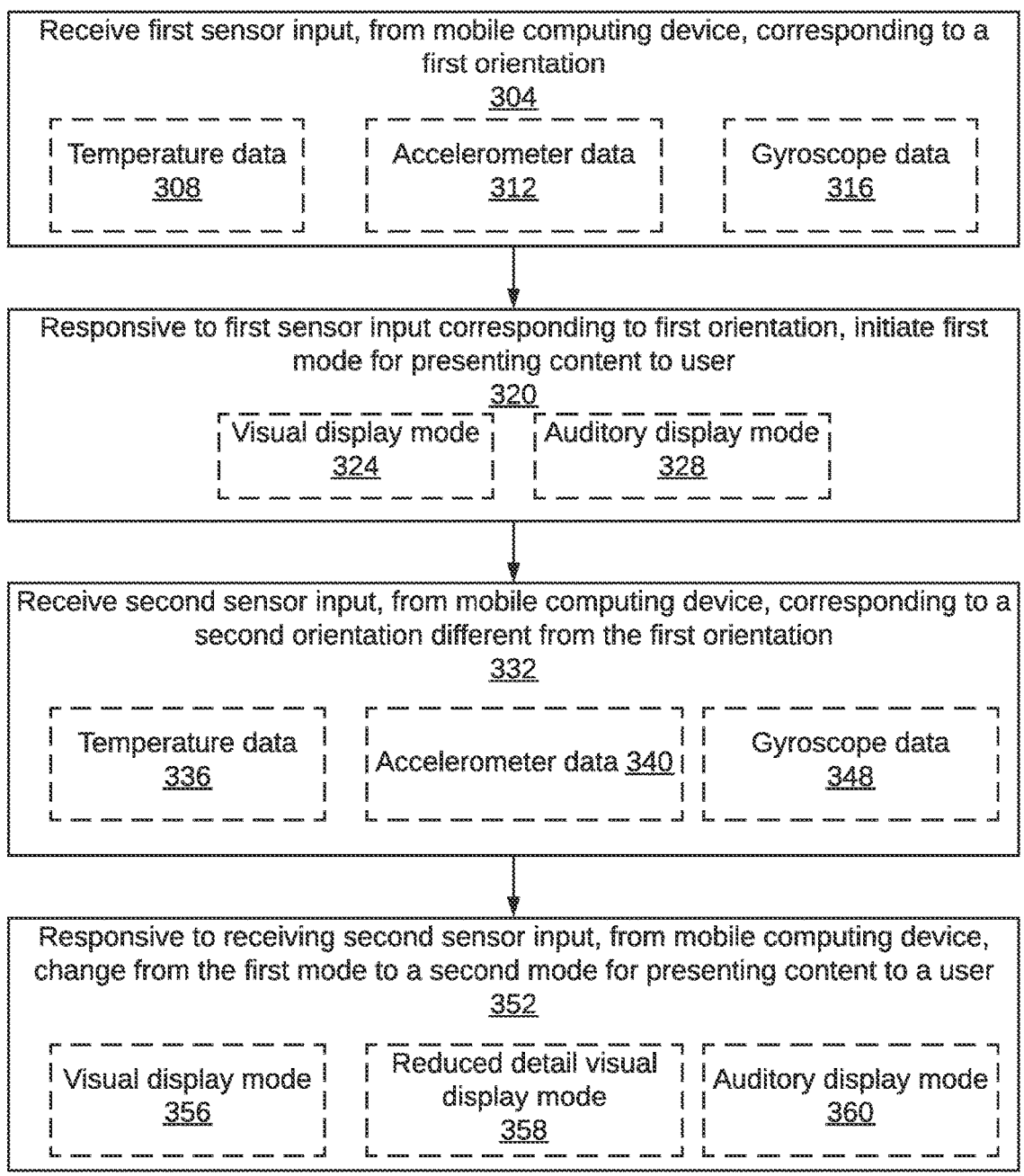

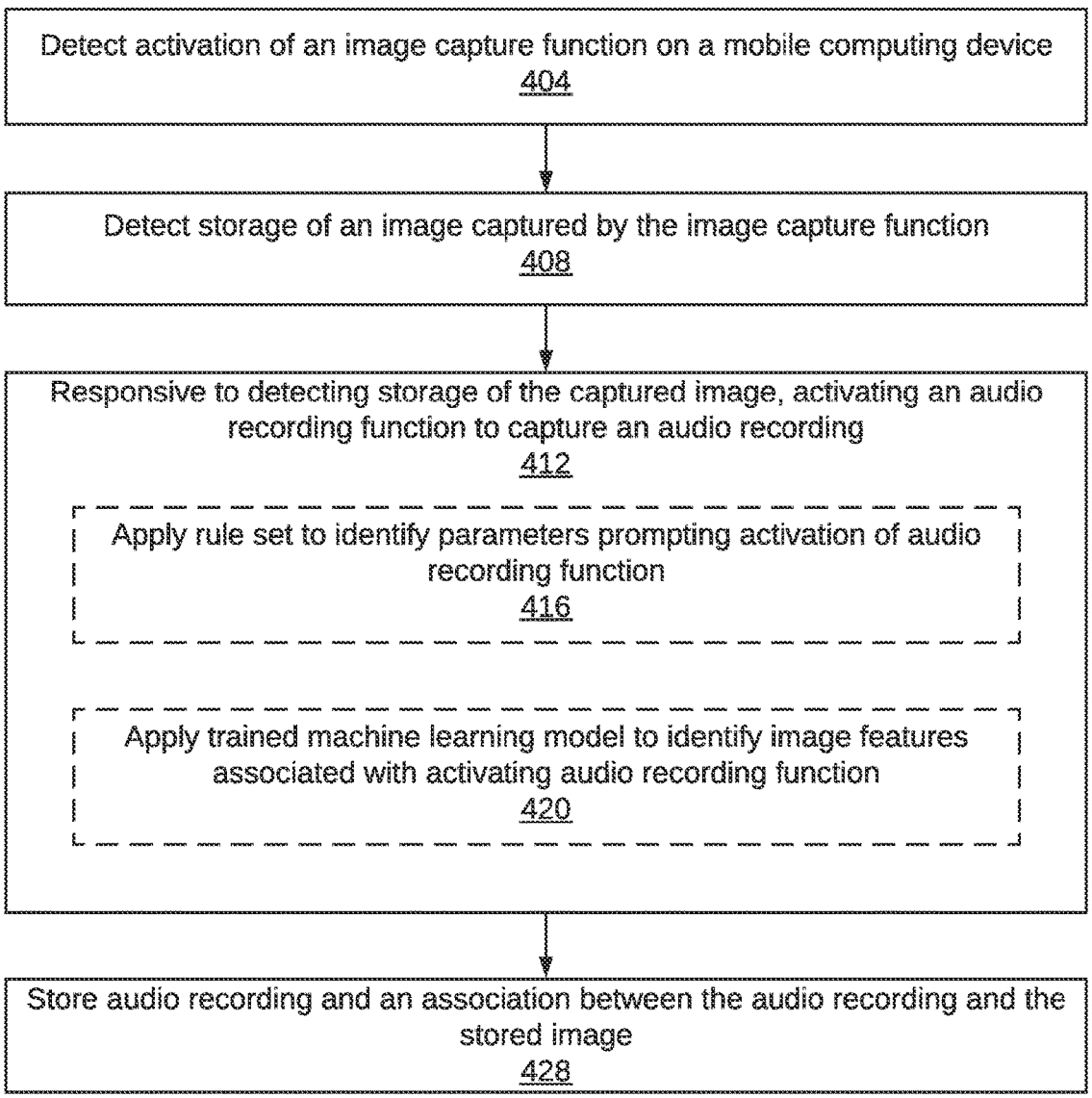

DYNAMIC USER INTERFACE MODE SELECTION BASED ON PHYSICAL ACTIVITY DETECTION

BENEFIT CLAIMS; RELATED APPLICATIONS; INCORPORATION BY REFERENCE

This application claims the benefit of U.S. Provisional Patent Application 63/080,410, filed Sep. 18, 2020, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to selecting applications on mobile devices. In particular, the present disclosure relates to dynamic user interface mode selection based on activity detection.

BACKGROUND

Mobile computing devices are used throughout a variety of business environments to improve productivity. While often used as a tool to maintain a high rate of communication responsiveness (e.g., via a mobile phone application, a mobile email application, and the like), organizations are introducing mobile communication devices to improve user productivity for other types of tasks. Whether in manufacturing production environments or remote field work that includes multi-modal observation, the multiple input and output modes and the diversity of possible functions enable mobile computing devices to significantly improve worker productivity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1A illustrates a system in accordance with one or more embodiments;

FIG. 2 illustrates an example set of operations for selecting a content presentation mode based on movement of a mobile device in accordance with one or more embodiments;

FIG. 3 illustrates an example set of operations for selecting a content presentation mode based on sensor data acquired by sensors associated with a mobile device in accordance with one or more embodiments;

FIG. 4 illustrates an example set of operations for activating an application in communication with a mobile device in response to detecting features in an image captured by the mobile device in accordance with one or more embodiments;

DETAILED DESCRIPTION

Figure 1B:
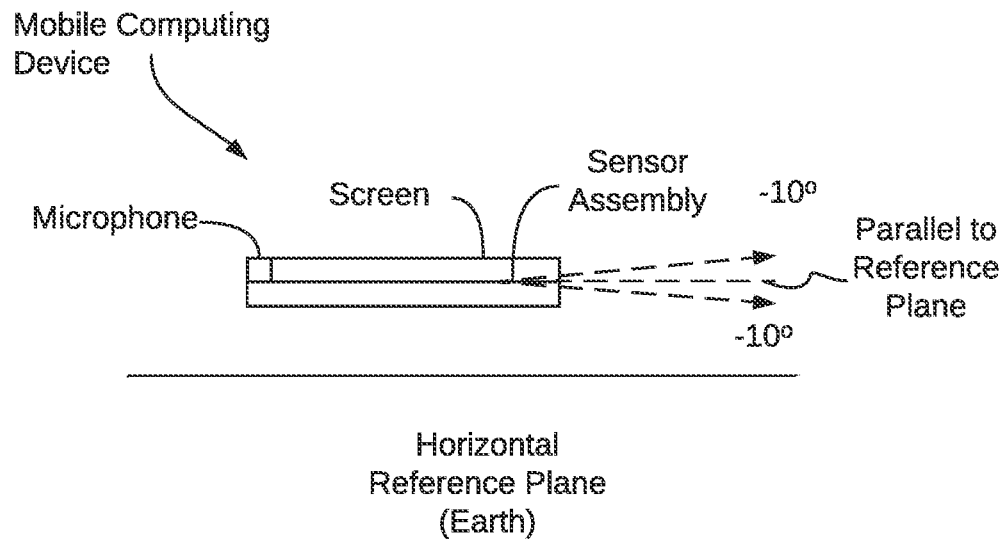
FIGS. 1B and 1C illustrate different orientations of a mobile computing device relative to a horizontal reference plane in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SELECTING A CONTENT PRESENTATION MODE USING PHYSICAL MEASUREMENT SENSORS OF A MOBILE COMPUTING DEVICE
    3.1 SELECTING A CONTENT PRESENTATION MODE BASED ON WHETHER THE MOBILE COMPUTING DEVICE IS IN MOTION OR STATIONARY
    3.2 SELECTING A CONTENT PRESENTATION MODE BASED ON AN ORIENTATION OF THE MOBILE COMPUTING DEVICE
4. ENGAGING AN APPLICATION BASED ON CONTENT OF A CAPTURED IMAGE
5. EXAMPLE EMBODIMENTS
6. COMPUTER NETWORKS AND CLOUD NETWORKS
7. MISCELLANEOUS; EXTENSIONS
8. HARDWARE OVERVIEW

1. GENERAL OVERVIEW

One or more embodiments improve the convenience of mobile computing devices and the convenience with which mobile computing devices may be used to engage multiple different computing applications. In some embodiments described below, sensors associated with a mobile computing device (e.g., accelerometers, gyroscopes, light sensors, microphones, image capture sensors) may receive inputs of various physical conditions around the mobile computing device.

Based on one or more of the inputs, the mobile computing device may detect an application executed by the mobile computing device and automatically select a content presentation mode that is likely to improve the consumption by the user of content associated with the executed application. In some examples, the system may detect whether a mobile computing device is in motion or not in motion. The system may present content for the executed application in a first content presentation mode when the system detects that the mobile communication device is in motion. The system may present content for the executed application in a second content presentation mode when the system detects that the mobile communication device is in not motion.

As an example, the mobile computing device may detect whether the mobile computing device is held by a user or is placed on a stable support surface. Based on this determination, the mobile computing device may use the techniques described below to select between different content presentation modes (e.g., visual or auditory). As another example, the mobile computing device detects a current orientation, whether vertical or horizontal, and selects between different content presentation modes based on the detected orientation. Different content presentation modes may also be selected based on a combination of detected inputs and an application that is presenting the content.

In some embodiments, the mobile computing device uses sensor input, include image sensor data, to not only select between content presentation modes but also to engage additional computing applications. In some examples, a trained machine learning model may analyze image data captured by a mobile computing device and engage particular computing applications upon detecting one or more features within the captured image.

One or more embodiments described in this Specification and/or recited in the claims may not be included in this General Overview section.

2. ARCHITECTURAL OVERVIEW

FIG. 1A illustrates a system 100 in accordance with one or more embodiments. As illustrated in FIG. 1A, system 100 includes a mobile computing device 102, a machine learning (ML) application 118, a data repository 154 and external resources 158A, 158B. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. For example, while some functions are shown in FIG. 1A as executed within the ML application 118, it will be appreciated that in other embodiments these functions may be executed by the mobile computing device 102. Operations described with respect to one component may instead be performed by another component.

Additional embodiments and/or examples relating to computer networks are described below in Section 6, titled "Computer Networks and Cloud Networks."

In some examples, the mobile computing device 102 may be any type of mobile computing device (e.g., a mobile phone, a tablet computer, a laptop computer) that includes one or more sensors measuring various external conditions. The mobile computing device 102 may be capable of executing computing applications and/or communicating with another computing device capable of executing computing applications via a network. In some examples, the mobile computing device 102 may include one or more of a web browser, mobile application(s) (alternatively and equivalently referred to as "computing applications"), or other software application communicatively coupled to the mobile computing device 102. In some examples, mobile applications executable by the mobile computing device 102 may include an image capture application for capturing still images and/or video images, a microphone for capturing verbal and/or sound stimuli, content presentation applications that operate in cooperation with a speaker and a visual display integrated with the mobile computing device. The mobile computing device 102 may also execute specific application, for example, calendar applications, communications applications (e.g., text, email, phone), as well as business applications, such as financial, inventory, expense reporting, or other business function applications.

The mobile computing device 102 shown in FIG. 1A includes sensors 106, user input/output devices 110, and an application activity monitor 114.

The sensors 106 of the mobile computing device 102 may include any sensors used to receive data regarding physical conditions surrounding or otherwise affecting with the mobile computing device 102. Example sensors 106 include, but are not limited to, gyroscopes, accelerometers, temperature sensors (e.g., an infrared sensor), fingerprint sensors, light and/or image sensors, global positioning satellite (GPS) sensors, among others.

The user I/O device 110 of the mobile computing device 102 may include a microphone for capturing, recording, and/or storing sound stimuli, an image capture device for capturing, recording, and/or storing visual images (whether still images or video images). Also included in the user I/O devices 110 are a speaker for presenting audio content to the user and a screen (also referred to as a display) for presenting visual content to the user. Examples of visual text include text, still images, video, animated graphics, schematic plans, and combinations thereof.

The mobile computing device 102 also includes an application activity monitor 114 that may identify the various computing applications operating on the mobile computing device 102. In some examples, the application activity monitor 114 may detect the execution of applications configured to operate sensors 106 and/or user I/O devices 110. In other examples, the application activity monitor 114 may detect computing applications and/or processes currently executing on the mobile computing device. In other examples, the application activity monitor 114 may store a timeline and/or history of previously executed applications and/or processes.

Specific applications and other components of the mobile computing device 102 (e.g., memory, storage, processors, voltage regulators, display drivers, radio frequency (RF) transceivers) are not expressly shown for clarity but will be understood to be present. A mobile computing device 102 may interact with an embodiment of the machine learning application 118 that is instantiated as a cloud service using one or more communication protocols, such as HTTP and/or other communication protocols of the Internet Protocol (IP) suite.

The example machine learning (ML) application 118 illustrated in FIG. 1A includes a mobile device sensor input 122, orientation analysis logic 124, a machine learning engine 130, a frontend interface 146, and an action interface 150. In some embodiments, ML application 118 is a cloud service, such as a software-as-a-service (SaaS) or a web service. In other embodiments, the ML application 118 is operated as a dedicated system (e.g., in a private network, an "on-premises" computer system, a private distributed computer network system).

The mobile device sensor input 122 and the command generator 142 operate in configurations of embodiments of the system 100 in which analysis of mobile device sensor data and the commands resulting from the analysis are executed by the machine learning application 118. In other embodiments, sensor data and the commands resulting from the analysis may, at least in part, be executed by the mobile computing device 102 itself.

The mobile device sensor input 122 receives sensor data transmitted from the mobile computing device 102 and executes an initial analysis in preparation for passing the received sensor data to the machine learning engine 130. For example, the mobile device sensor input 122 may receive data of various types including, but not limited to, audio data, still image data, temperature data, accelerometer data, gyroscope data, light intensity data, and/or an identification of a mobile computing application being executed concurrently with sensor data collection. Upon receiving any one or more of these data types, the mobile device sensor input 122 may identify the sensor input type to the machine learning engine 130 and then pass the identified data to the machine learning engine 130 for analysis.

In some examples, one or more elements of the machine learning engine 130 may use a machine learning algorithm to identify or select a content presentation mode based on a set of sensor data. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, back propagation, clustering, and/or neural networks.

In this example, the machine learning engine 130 includes training logic 134, an image processor 138, and a command generator 142. However, as previously indicated, the components of system 100, including the ML application 104 generally and/or the machine learning engine 130 specifically, may vary depending on the particular implementation.

In this example, the training logic 134 may receive a set of electronic documents as input (i.e., a training corpus). Examples of electronic documents include, but are not limited to, electronically stored images, electronically stored sensor data from a mobile computing device, instruction media output modes (e.g., auditory vs. visual) corresponding to the electronically stored images and/or sensor data, and the like. In some examples, images and/or sensor data used for training may be labeled with a corresponding media output mode.

In one example, the training logic 134 may execute ML training algorithms to build a trained ML model ultimately stored in the ML learning engine 130. Once trained, the ML learning engine 130 may then be used in some embodiments according to the methods described below in FIGS. 2 and 3. Example ML training algorithms and ML models include, but are not limited to, unsupervised and supervised learning algorithms (e.g., neural networks).

In some embodiments, the training logic 134 includes a feature extractor that is configured to identify feature values and generate feature vectors from training materials, such as those described above. The feature extractor may tokenize sensor input data in a training corpus and then generate feature vectors that include a sequence of values, with each value representing a different token.

In some examples, labels may be assigned to (or appended to) feature vectors and/or otherwise associated with constituent tokens of feature vectors. A feature extractor in the training logic 134 may append other features to the generated feature vectors. In one example, a feature vector may be represented as $[f_1, f_2, f_3, f_4]$, where $f_1, f_2, f_3$ correspond to tokens and where $f_4$ is a feature represented by a token not necessarily extracted from the training corpus, such as a label. For example, a set of tokenized sensor data represented as a feature vector may be appended with a label that indicates a vertical orientation of a device, thereby associating that particular set of sensor data with a computing device orientation. In another example, another set of tokenized sensor data represented as a feature vector may be appended with a label that indicates a mode in which instructions are to be presented (e.g., audio or visual).

Using these training data, the ML engine 130 is configured to automatically learn, from the training logic 134, which combinations of sensor data from the mobile computing device 102 are associated with particular content presentation modes.

The ML engine 130 is also configured to contemporaneously identify a content presentation mode upon receiving new ("target") sensor data from a mobile computing device. In some types of machine learning models, target data may be subsequent analysis) may be executed upon determining a similarity (e.g., using cosine similarity) between a labeled training data and target data. In other types (such as neural networks), target data is analyzed by determining gradients for a cost function that is subsequently applied to a series of intermediate "layers" of calculation.

Some types of data received from the sensors 106 of the mobile computing device may be easily analyzed by the system. For example, gyroscope data from the sensors 106 of the mobile computing device 102 may include a set of numerical data that informs the machine learning engine 130 (via the mobile device sensor input 122) of various coordinates and/or orientations in space of the mobile computing device 102. Other types of data (e.g., some types of movement data, ambient temperature data, light intensity data, GPS coordinate data) may also be analyzed by the ML application 118 with a relatively low consumption of computational resources.

In some examples, these types of data that are efficiently processed may be analyzed to determine a content presentation mode using a rule-based approach. In the illustrated example, the orientation analysis logic 124 in the machine learning application 118 may store one or more rules that may, in some embodiments, be used to analyze sensor data and select a content presentation mode. In some examples, the use of rules in the orientation analysis logic 124 may be used instead of the trained machine learning analysis of the machine learning engine 130. For example, the orientation analysis logic 124 may define a rule that associates a particular orientation (e.g., horizontal) with an audio presentation mode. The orientation analysis logic 124 may receive sensor data and, for data that is encompassed by one or more rules defined in the orientation analysis logic 124, identify an orientation of the mobile computing device. The analysis generated by the orientation analysis logic 124 may then be used in cooperation with other elements of the machine learning application 118 to select a content presentation mode. Once selected, other elements of the machine learning application 118 may transmit an instruction to the mobile computing device to use the selected content presentation mode.

However, other types of data may involve an additional layer of processing by the machine learning engine 130 to interpret and/or process the data before using the data to select a content presentation mode. For example, image data captured by a camera of a mobile computing device 102 may require additional processing and/or analysis before the machine learning engine 130 may analyze the data as part of the process for determining a content presentation mode.

The machine learning engine 130 includes an image processor 138 that provides additional processing of image data. For example, the image processor 138 may generate image feature vectors of images transmitted from the mobile computing device 102 via the mobile device sensor input 122. In some examples, the image processor 138 may generate image feature vectors using a trained "classifier" machine learning model (e.g., a Euclidean distance classifier), a trained neural network, and the like to interpret image data. These feature vectors may then be analyzed using a trained model to identify image features.

Once the image processor 138 has identified one or more features within image data, these features may be passed to other elements of the trained machine learning engine 130. The trained machine learning engine 130 may use the processed image data to determine an orientation of the mobile computing device 102 and identify an appropriate content presentation mode using, at least in part, the image data.

For example, the feature vectors generated by the image processor 138 from image data may indicate image features that are associated with a transition from a vertical (or inclined) orientation of the mobile computing device 102 to a horizontal orientation of the mobile computing device 102. Examples of image features associated with a vertical orientation of the mobile computing device 102 include walls, shelves, humans, vehicles, stacked objects, furniture, and the like. Examples of image features associated with a horizontal orientation of the mobile computing device 102 include ceilings, overhead lights, rafters, beams, overhead cranes, ventilation ducts, ceiling tiles, and the like. The transition from a vertical orientation to a horizontal orientation may be associated with, by the trained machine learning model, a transition from a visual content presentation mode to an auditory content presentation mode.

This example may also be instantiated without a machine learning model, but instead executed upon identification of the features using a vector analysis of images and a stored instruction set associated with one or more identified image features (e.g., a rule set).

In still other embodiments, the machine learning application 118 may use both the rule-based analysis of the orientation analysis logic 124 and the machine learning engine 130 to complement one another. For example, because of the variety of possible orientation (and other) data of the mobile computing device, the orientation analysis logic 124 and the machine learning engine 130 may both analyze data to identify an orientation. Some sensor data from the mobile computing device 102 may be easily and efficiently analyzed by the orientation analysis logic 124 whereas other, more ambiguous data may be analysis by the machine learning engine 130. The cooperative analysis may be combined using confidence intervals (e.g., probability calculations), similarity scores, and the like to reach a conclusion regarding an orientation of the mobile computing device 102.

The machine learning engine 130 may include other processing elements, not shown, for other types of specific data. Processing techniques similar to those described for the image processor 138 (e.g., classifiers, neural networks) may be applied to audio data or other data.

Upon identifying an orientation of the mobile computing device 102 and identifying a content presentation mode corresponding to the orientation, the command generator 142 may generate an instruction to be sent to the mobile computing device 102. That is, the command generator 142 of the ML engine 130 may generate a command to be sent to the mobile computing device that instructs the mobile computing device 102 to present data in a particular content presentation mode based on the orientation as determined by the ML engine 130.

Once the content presentation mode instruction is generated, the command generator 142 may interact with other elements of the ML application 118 to transmit the instruction to the mobile computing device 102. In some examples, the command generator 142 communicates with one or both of the frontend interface 146 and/or the action interface 150 to communicate instructions to the mobile computing device 102.

The frontend interface 146 manages interactions between ML application 118 and the mobile computing device 102. For example, mobile computing device 102 may submit requests to perform various functions and view results through frontend interface 146. In some embodiments, frontend interface 146 is a presentation tier in a multitier application. Frontend interface 146 may process requests received from the mobile computing device 102, and translate results from other application tiers into a format that may be understood or processed by the clients. Frontend interface 146 may be configured to render user interface elements and receive input via user interface elements. For example, frontend interface 146 may generate webpages and/or other graphical user interface (GUI) objects. Client applications, such as web browsers, may access and render interactive displays in accordance with protocols of the internet protocol (IP) suite. Additionally or alternatively, frontend interface 146 may provide other types of user interfaces comprising hardware and/or software configured to facilitate communications between a user and the application.

The action interface 150 action interface 150 provides an interface for executing actions using computing resources, such as external resources 158A, 158B. Action interface 150 may include an API, CLI, or other interfaces for invoking functions to execute actions. One or more of these functions may be provided through cloud services or other applications, which may be external to ML application 118.

In some embodiments, external resources 158A, 158B are network services that are external to ML application 118. Example cloud services may include, but are not limited to, social media platforms, email services, short messaging services, enterprise management systems, verbal communication systems (e.g., internet based voice communications, text chat communications, POTS communications systems) and other cloud applications. Action interface 150 may serve as an API endpoint for invoking a cloud service. For example, action interface 150 may generate outbound requests that conform to protocols ingestible by external resources 158A, 158B. Action interface 150 may process and translate inbound requests to allow for further processing by other components of ML engine 130. Action interface 150 may store, negotiate, and/or otherwise manage authentication information for accessing external resources 158A, 158B. Example authentication information may include, but is not limited to, digital certificates, cryptographic keys, usernames, and passwords. Action interface 150 may include authentication information in the requests to invoke functions provided through external resources 158A, 158B.

In one or more embodiments, the system 100 may include one or more data repositories 154. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

A data repository, such as the data repository 154 shown, may be implemented or may execute on the same computing system as the machine learning application 118. The data repository 154 may be communicatively coupled to the machine learning application 118 via a direct connection or via a network.

Information describing the operations of the machine learning application 118 may be implemented across any of components within the system 100.

In one or more embodiments, the various elements of the system 100 refer to hardware and/or software configured to perform operations described herein. Examples of these operations for are described below with reference to FIGS. 2, 3, and 4.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interfaces 146, 150 refer to hardware and/or software configured to facilitate communications between a user and the mobile computing device 102 or between the mobile computing device 102 and the machine learning application 118. Interfaces 146, 150 render user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the interfaces 146, 150 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interfaces 146, 150 are specified in one or more other languages, such as Java, C, or C++.

For clarity of explanation, FIG. 1B illustrates ranges of orientation associated with a horizontal orientation of a mobile computing device. FIG. 1B shows that a plane including the screen of the mobile computing device may be +/−10° above or below a plane parallel to a horizontal reference plane (e.g., a flat portion of the earth below the mobile computing device). In other examples, the mobile computing device may be considered to be in a "horizontal" orientation for angles between +/−20° or even as high as +/−40° relative to the parallel horizontal reference plane in FIG. 1B.

FIG. 1B illustrates locations of a microphone, a screen, and a sensor assembly of the mobile computing device. The sensor assembly, which may include one or more of gyroscopes, accelerometers, thermometers, and light sensors, is also shown for reference.

Figure 1C:
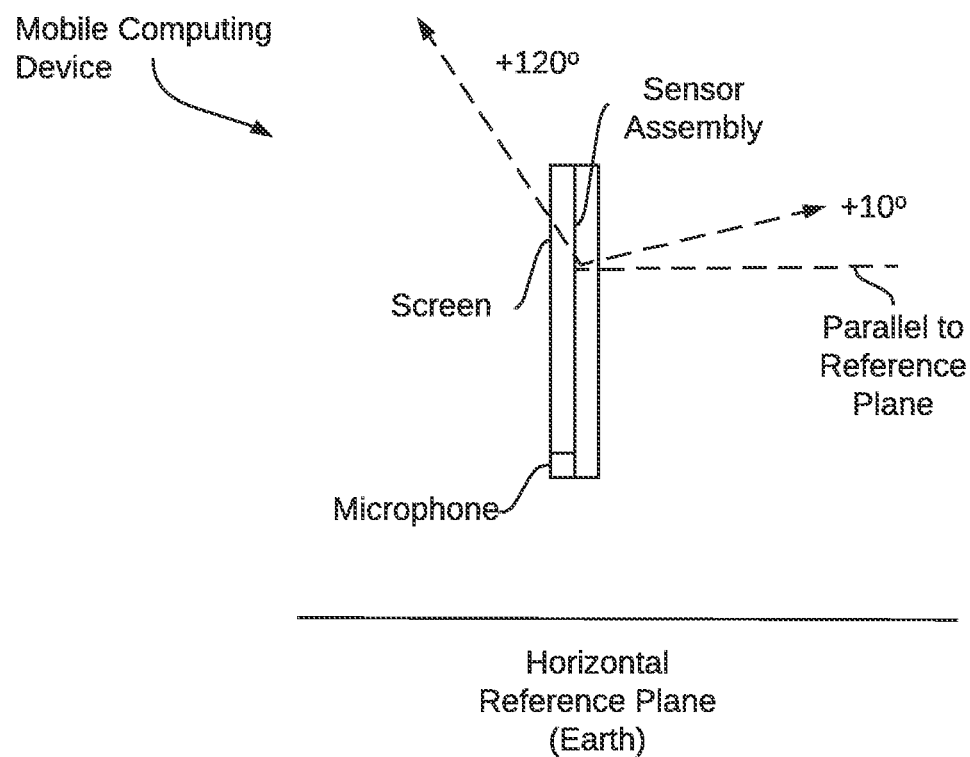

FIG. 1C illustrates ranges of orientation associated with a vertical orientation of a mobile computing device. In this example, the mobile device may be considered to be in a vertical or inclined orientation when a plane defined by a screen of the mobile computing device is inclined from +10° to +120° (i.e., "above") relative to a plane parallel to the horizontal reference plane. In an analogous example, the mobile device may be considered to be in a declined (non-horizontal) orientation when the plane defined by the screen of the mobile computing device is declined from −10° to −120° (i.e., "below") relative to a plane parallel to the horizontal reference plane. As with the scenario described in FIG. 1B, the precise values of these angles may be adjusted in different examples.

3. SELECTING A CONTENT PRESENTATION MODE USING PHYSICAL MEASUREMENT SENSORS OF A MOBILE COMPUTING DEVICE

This Section 3, in the context of FIGS. 2, 3, and 4, describes example sets of operations selected upon detection of various conditions associated with a mobile computing device in accordance with one or more embodiments. One or more operations illustrated in FIGS. 2, 3, and 4 may be modified, rearranged, or omitted all together. Accordingly, the particular sequence of operations illustrated in these Figures should not be construed as limiting the scope of one or more embodiments.

More specifically, Section 3.1 (FIG. 2) describes techniques in which a mobile computing device (or a system in communication with a mobile computing device) uses sensor data to detect whether a mobile computing device is in motion (e.g., held in a hand) or is stationary (e.g., placed on a support surface). Each of these conditions is associated with a particular content presentation mode (e.g., visual or auditory), which the system selects automatically.

Section 3.2 (FIG. 3) describes techniques in which the mobile computing device (or an associated system) uses sensor data to detect an orientation of the mobile computing device. A particular content presentation mode is selected based on the orientation. FIG. 4 describes techniques in which image processing may be used to engage additional computing applications as a function of features detected in a captured image.

3.1 Selecting a Content Presentation Mode Based on Whether the Mobile Computing Device is in Motion or Stationary As indicated above, FIG. 2 illustrates an example set of operations, collectively identified as a method 200, in which a system selects between content presentation modes (also referred to equivalently as "user interface outputs" or "user interface output modes") based on the detection of various physical conditions associated with a mobile computing device. These user interface outputs switch from one particular content presentation mode to a different content presentation mode based on the detected physical conditions. This improves the convenience with which a user may interact with a mobile computing device. Automatically switching between content presentation modes based on sensor data, without express instructions entered by a user, may also improve efficiency and/or productivity of a user by reducing interruptions to a task that the user is performing.

The method 200 may begin by the system detecting execution of an application by a mobile device and also detecting that the mobile device is in motion (operation 204). Detecting execution of an application by the mobile computing device is accomplished using any number of techniques. For example, some elements of the system (e.g., the system 100) may detect packets transmitted by the mobile device through, for example, a packet switched network. The system may detect an identifier or other characteristic information associated with the application being executed by the mobile computing device in header or payload portions of the detected packet(s). The detected identifier may be used to detect the execution of the application. For example, the packet may be addressed to a particular server or device in communication with the network that is associated with a particular application being executed (e.g., a dedicated application server). In other examples, the packet may include protocols, instructions, or data encoded for processing by a particular application. In other examples, the system may execute a deep packet inspection to identify the application executed by the mobile device.

The system may detect the motion of the mobile device using any of the techniques described above in the context of FIG. 1A. For example, the system may determine that the mobile device is in motion by analyzing gyroscope data as a function of time generated by a gyroscope integrated with the mobile device. In other examples, the system may detect movement of the mobile device by analyzing image data captured over a period of time by an image sensor used in a camera function of the mobile device. The system may identify one or more features within an image (e.g., a face, structure features such as windows, doors, any structure defining a line or shape used as a reference) and detect changes of location of the image feature within successive captured images by detecting changes in coordinates of particular pixel intensities used to form the image of the feature.

In one example, the system may even detect the subtle movements of the mobile device that are associated with the device being held by a user (e.g., in a hand) (operation 206). For example, the operation of human muscles is associated with some degree of variability and/or instability in the exerted force. In some examples, an object (such as a mobile device) held by a user will vary around a location at a frequency or variability in location that are characteristic of the operation of human muscles. A device being held by a user while walking will exhibit a pattern of movement associated with a walking or running gait. The system may detect and identify these characteristic patterns in movement, even when subtle.

Because the operations of the method 200 are not necessarily a function of mobile device orientation, but rather on sensor inputs indication motion (whether vibration, rotation, translation) the mobile device may be oriented vertically or horizontally in any of the operations of the method 200.

As described elsewhere herein, the system may use one or both of a rule-based approach to detecting movement of the mobile device and/or a trained machine learning model approach. As described above in the context of FIG. 1A, patterns in image data or sensor data may be associated with rules to assign movement to the device, or even a type of movement (e.g., held by a stationary user, held by a walking or driving user, attached to a support that is held by a user or attached to a moving vehicle). Similarly, a training corpus of sensor data (including still-image and video image data) may be used to associate certain patterns in the sensor data with movement and/or types of movement.

Upon detecting both execution of the application and motion associated with the mobile device, the system may then select a content presentation mode based upon the determination that the mobile device is in motion (operation 208). The system may select the content presentation mode based on the rules and/or the trained machine learning model described above. For example, if the motion of the mobile device is associated with a user holding the mobile device, then the system may select a visual content presentation mode that uses an integrated display of the mobile device. The selection of this visual content presentation mode may be made based on the presumption (or training) that the user is holding the mobile device in a position that enables an integrated display to be viewed by the user.

In an alternative scenario, the system may select an auditory content presentation mode when detecting certain types of motion. For example, if the type of motion detected is associated with that of a moving vehicle, which will have a very different distribution of vibrations, speed and/or changes in location (as indicated by a GPS sensor in the mobile device), the system may select the auditory content presentation mode to avoid distracting the user with a visual display of content.

Based on the selection performed in the operation 208, the system may present content in the selected mode (operation 212). The system may access the content, encode the content according to the selected mode and then transmit the correspondingly encoded content for presentation. For example, upon determining that the content should be presented in an auditory content presentation mode in the operation 208, the system may access a text-based content item and convert the text data to corresponding machine-generated voice data that is presented via a speaker in communication with the mobile device. Alternatively, upon determining that the content should be presented in a visual content presentation mode in the operation 208, the system may access a text-based content item, and simply transmit it for presentation as text to be rendered on a display of the mobile device. Alternatively, an audio portion of audiovisual content may be presented on the mobile device, or a text explanation in an audiovisual content item may be converted to audio data and presented.

In some examples, the system may detect changes in the movement of the mobile device and alter the presentation mode accordingly. This change in content presentation mode is illustrated in the example operations 216-228 of the method 200.

In this example, the system may detect that the mobile device that is executing the application is no longer in motion (operation 216). The system may detect the execution of the operation and the cessation of motion using the techniques described above in the context of the operation 204. In some examples, the cessation of motion may be associated with the mobile device being placed on a support surface (operation 218). For example, the sensor data may indicate that the mobile device has been placed on a shelf, a desk, a floor, or even on a stationary support that is attached to a shelf, a desk, or a floor. The operation 218 may even include the mobile device being placed in a bracket that is attached to a stable anchor (e.g., a table, a wall, a support). In other examples, the cessation of motion may be associated with the mobile device being placed in a pocket of a stationary user.

In response to the operation 216, the system may select a second content presentation mode for the executing application that is different from the first content presentation mode (operation 220). For example, the system may select an auditory mode upon the device being stationary based on a presumption (or training of a machine learning model) that the visual display is no longer visible to the user. This may be the case for a mobile device placed horizontally on a surface, thereby rendering its display less visible to the user.

The content previously presented in the operation 212 in the first mode may then continue to be presented by the system in the second mode (operation 228).

3.2 Selecting a Content Presentation Mode Based on an Orientation of the Mobile Computing Device In an alternative embodiment, a system may use mobile computing device sensor data to detect a change in orientation of the mobile computing device. The detected change in orientation may be used to cause a change in content presentation mode. FIG. 3 illustrates an example set of operations, collectively identified as a method 300, in which a system selects between content presentation modes based on a detected mobile device orientation. As with the method 200, the method 300 may improve the convenience with which a user may interact with a mobile computing device. Automatically switching between content presentation modes based on sensor data, without express instructions entered through a user interface, may improve efficiency and/or productivity of a user by reducing interruptions to a task that the user is performing that may involve use of the mobile computing device.

The method 300 may begin upon the system receiving a first set of one or more sensor inputs from sensors associated with the mobile computing device. This first set of sensor inputs may correspond to a first orientation (operation 304).

Examples of sensor data that may be used to determine an orientation of the mobile device include temperature data (operation 308), accelerometer data (operation 312), and/or gyroscope data (operation 316). While not illustrated in FIG. 3, it will be appreciated that GPS data, image data, or other types of data collected by sensors associated with a mobile device may be used to determine orientation of the device.

For example, some mobile devices are equipped with sensors, such as infra-red sensors, that may be used to detect temperature (operation 308). In some cases, the temperature sensor may be configured to detect a temperature of an ambient environment in which the mobile device is disposed. In other examples, the temperature sensor may be a "spot" sensor that detects a temperature of a target or a portion of a target (e.g., 1 square centimeter at a distance of 1 meter) at which the sensor is directed. In some examples, a temperature sensor may optionally be integrated with an image sensor of a camera. In other examples the temperature sensor may be separate from, but in communication with, the mobile device.

The system may also use temperature data to determine orientation by, for example, detecting whether the mobile device is proximate to objects that are known to produce heat, such as ceiling lighting fixtures in an industrial, commercial, or warehouse setting. In other examples, temperature data may be used (in coordination with other sensor data) to determine whether the mobile device is proximate to a human user (e.g., by detecting body temperature). This proximity may be used to determine orientation.

The system may also use accelerometer data to determine an orientation of a mobile device (operation 312). For example, using multi-axis accelerometer devices integrated with a mobile device (e.g., micro electro-mechanical system (MEMS) for x, y, and z axes), the system may track changes in orientation. In some examples, these data may be combined with gyroscope data (e.g., from a MEMS gyroscope) (operation 316) to determine orientation. Alternatively, gyroscope data may itself be used for determining orientation without using (operation 316). Data from a fingerprint sensor may also be used to determine orientation in some cases.

Some or all of these data may be collected over a period of time. For example, the system may track accelerometer data over a period of time and using these data identify a series of orientations including a current orientation.

As described above, particular ranges of these data and/or combinations of ranges from these different types of data may be associated with a particular orientation. The system may establish these associations by applying a set of one or more rules, or via a trained machine learning model. For example, receiving input via a fingerprint sensor may be associated with a vertical orientation. This orientation may be confirmed by application of a rule analyzing accelerometer and/or gyroscope data. Alternatively, a trained machine learning model may identify a mobile device orientation as vertical using these data in combination with its training.

Some or all of these data types may also be used to determine whether the device is in motion, as described above in the context of the method 200.

Upon the system using the sensor input to identify the first orientation, the system may use the orientation to initiate a first mode for presenting content to a user (operation 320). In some examples, as described above in the context of the method 200, a visual display mode may be used to present content (operation 324). In some examples, as described above in the context of the method 200, an auditory display mode may be used to present content (operation 328).

In some examples, the visual mode may be associated with a vertical orientation because the vertical orientation may be associated with the mobile device being held by the user or propped vertically to improve a viewing angle. This need not be the case and may vary depending on a training corpus and/or rule set adapted for a particular use. While the presumption that a vertical orientation improves visual display accessibility may be valid in a warehouse, healthcare, or industrial setting (where users are often upright and moving), this may not be the case in an academic setting (where users are often stationary and sitting). An analogous explanation is applicable to the selection of an auditory display mode. The choice of which content display mode to employ for a given orientation will vary on the training data set used to train a machine learning model, and therefore on the particular application.

The method 300 continues upon the system receiving a second sensor input from the mobile computing device (operation 332). This second sensor input may correspond to a second orientation that is different from the first orientation. For example, the first orientation may be vertical and the second orientation horizontal, or vice versa. As described above, examples of sensor inputs include, but are not limited to, temperature data (operation 336), accelerometer data (operation 340), and gyroscope data (operation 348).

Responsive to receiving this second sensor input from the mobile computing device, the system may change the content presentation mode from the first mode to a second mode (operation 352). As described above in the context of the operation 320, the presentation modes include a visual display mode (operation 356) and an auditory display mode (operation 360). In the operation 352, the system may switch from a mode used in the operation 320 to a different mode in response to the detected change in orientation.

In one example, the system may transition from the visual display mode 324 to a second, different type of visual display mode 358 that presents less detail than the first visual display mode presented in the operation 324. For example, the first visual display mode 324 may present text instructions, diagrams, and other content information that is useful when read or viewed in detail by the user. The reduced detail visual display mode 358 may present content that may be both visible and informative when viewed at a distance or at a glance (e.g., on the order of milliseconds instead of the seconds or tens of seconds (or longer) for the first visual display mode 324). Examples of the reduced detail visual display mode 358 may include large font text (e.g., 16, 18, 24 point font vs. 8, 10, or 12 point font used in the first visual display mode 324), color coded fields, enlarged images (or a magnified portion of an image that occupies a large proportion of a display) or the like. This reduced detail visual display mode 358 may thus improve the utility of visual images when a user is walking, driving, or is otherwise viewing the visual display with a brief glance.

4. ENGAGING AN APPLICATION BASED ON CONTENT OF A CAPTURED IMAGE

FIG. 4 illustrates a set of example operations, collectively referred to as a method 400, that may activate, engage, or otherwise execute one or more applications on a mobile computing device in response to identifying features within an image captured by the mobile computing device.

The method 400 may begin by detecting activation of an image capture function on a mobile computing device (operation 404). The system may detect this activation using an application or process monitoring system. In some examples, this monitoring system may be native to the mobile computing device. In other examples, the mobile computing device may be configured to transmit a signal to a remote system (e.g., a server) upon activation of the image capture function. The remote system may in turn detect activation of the image capture function. Native application monitoring systems and packet analysis techniques used for identifying activation of an application are described above.

The system may detect storage of an image that has been captured by the image capture function (operation 408). For example, the system may identify a change to a file inventory and further identify an additional file with a file type extension associated with image data. In one embodiment of this example, the system may identify the addition of a locally stored file identified with a .PNG, .JPEG, .GIF file extension, all of which are associated with image data. In another embodiment of this example, the system may detect activation of the image capture function and transmission of the image data (e.g., encoded with protocols or data associated with one of the preceding file types or another file type) from an image capture application to a remote storage location. The system may also use file storage time stamps to detect a newly stored image files by comparing a storage time of a file with an image file extension stamp to a system clock time. In still another example, the system may detect a decrease in available non-volatile memory capacity that is associated with an indication of a captured image.

Regardless of how the captured image is detected, responsive to detecting the captured image, the system activates an audio recording function to capture an audio recording (operation 412). The system may transmit an instruction (e.g., via an operating system application programming interface or analogous system) to the audio recording application to activate the audio recording application and present a user interface (or other indication of the activation) to the user.

The system may engage the audio recording function in the operation 412 using any of several different techniques. For example, a set of rules may be used to identify the occurrence of a set or sequence of events that, collectively, are used as a trigger by which the system activates the audio recording function (operation 416). In one example, the system may detect (1) the storage of an image captured by the image capture function as described above and (2) one or more other applications that, collectively, are used to identify a rule that activates the audio recording function. An illustration of this example is presented below in the Example Embodiment section.

In another example, the system may include a trained machine learning model that recognizes image content and engages the audio recording function in response to features identified in the stored image (operation 420). In this operation, the system may include a trained machine learning model (trained according to the techniques described above) that, in some embodiments, may use an image classifier to identify image features. Neural networks or other machine learning models may also be trained and used.

In the operation 420, the trained machine learning model may be trained to recognize image features that are associated with triggering the audio recording function. In one illustration, also described below in more detail in the Example Embodiment section, a trained machine learning model may be trained to identify damaged product and activate an audio recording feature used to by a user to record information associated with a procedure for returning the damaged product.

More generally, the trained machine learning model may be trained to activate any application upon detecting features within an image. For example, continuing with the example above, the trained machine learning model may activate a return process application (or "return material authorization/RMA" application) upon identifying damaged product in a captured image.

The system may then store the audio recording captured by the audio recording function and further store an association between the audio recording and the stored image (operation 428). For example, the system may store a common record identifier, a URL or other active "pointer," or other logical database cross-reference linking the image data and the audio data. This reference linking the two stored data items improves the convenience of locating and accessing these related items.

5. EXAMPLE EMBODIMENTS

Figure 5A:
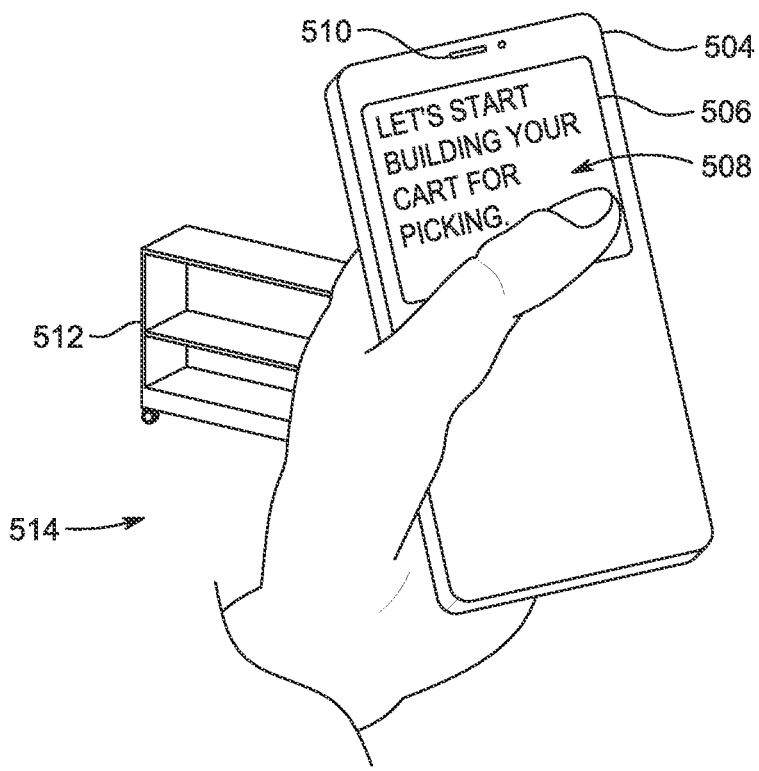
FIGS. 5A-5C illustrate an example set of user interface outputs selected upon detection of various physical conditions associated with a mobile computing device in accordance with one or more embodiments.
Figure 5B:
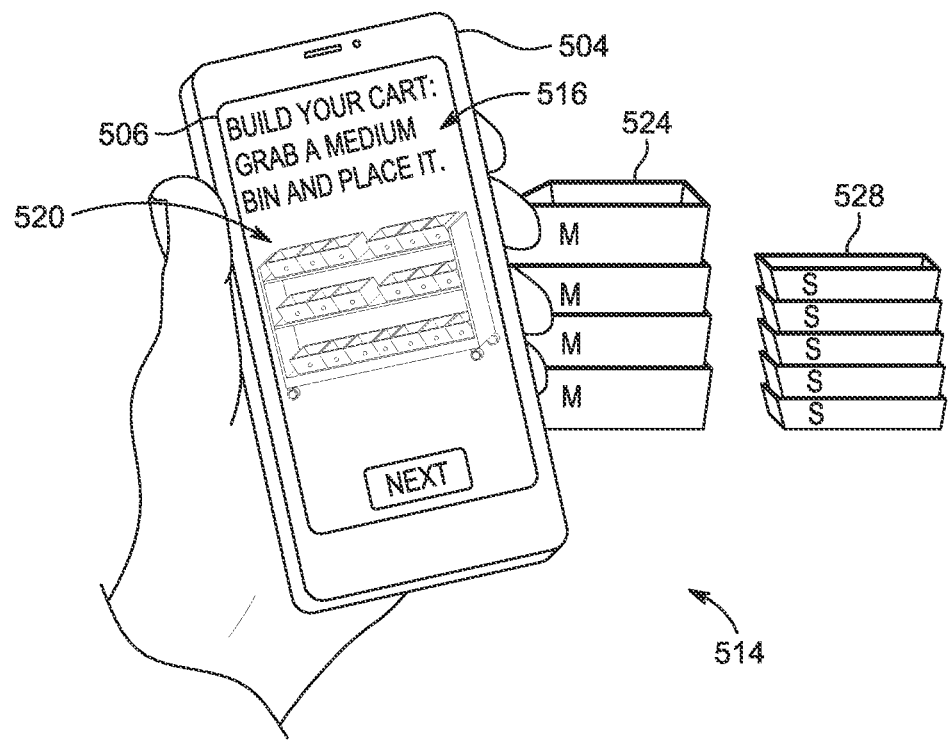
Figure 5C:
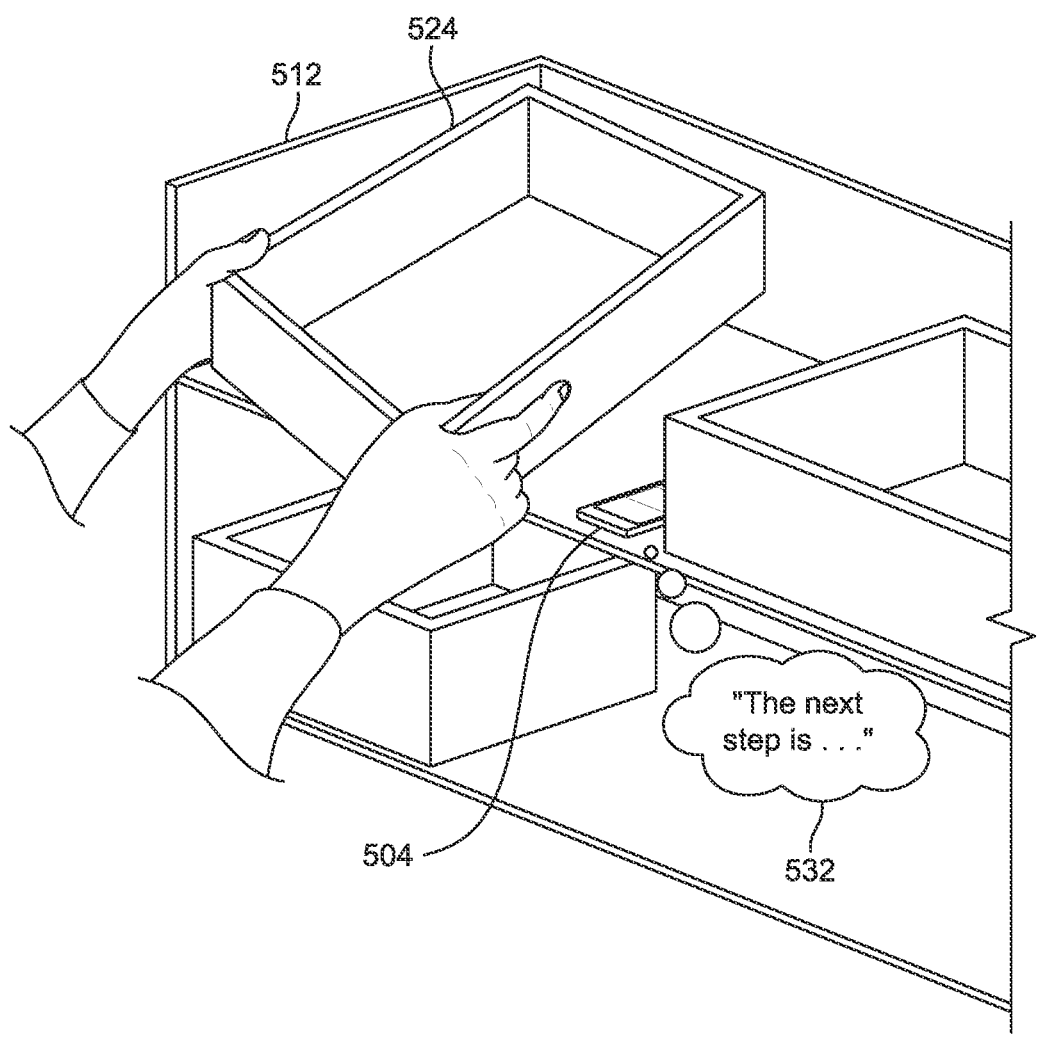

As indicated above, FIGS. 5A-5C illustrate an example set of user interface outputs that the system selects based on the detection of various physical conditions associated with a mobile computing device. These user interface outputs switch from one particular content presentation mode to a different content presentation mode based on the detected physical conditions. This improves the convenience with which a user may interact with a mobile computing device. Automatically switching between content presentation modes based on sensor data, without express instructions entered through a user interface, may also improve efficiency and/or productivity of a user by reducing interruptions to a task that the user is performing.

FIG. 5A illustrates one example scenario in which a user is holding a mobile computing device 504 that is displaying visual instructions 508 for supplying a cart 512 with bins (shown in FIG. 5C). The cart 512 is disposed on a floor 514 which, referring to FIG. 1C, acts as a horizontal reference plane.

The mobile computing device may be any type of mobile computing device, including those described above. Furthermore, the mobile computing device 504 may include any of the sensors described above in the context of FIG. 1A, including but not limited to accelerometers, gyroscopes, lights sensors, cameras, fingerprint sensors, global positioning satellite (GPS) sensors, thermometers, and the like. These sensors are omitted from FIGS. 5A-5C for clarity of depiction. As also described above in the context of FIG. 1A, the mobile computing device 504 may include various user I/O devices, including a visual display 506 and a speaker 510.

In this example, the mobile computing device 504 presents visual instructions 508 on the integrated visual display 506. While text instructions are shown in this example, it will be appreciated that the mobile computing device 504 may use any type of visual communication to present instructions. Examples of other types of visual instructions 508 that may be presented on the display 506 include text, still images, video, animated graphics, schematic plans, and combinations thereof.

The sensors in the mobile computing device 504 detect sensor inputs. The system may use the detected sensor input to determine that the device 504 is being held by the user. Based on this detection, the mobile computing device 504 determines that presentation of visual instructions is appropriate.

For example, the mobile computing device 504 (or a system to which it is connected, such as ML application 118) may use one or both of gyroscope and/or accelerometer data to determine the device 504 is being held using, for example, the techniques described in the context of FIG. 2. When held by a human user, the mobile computing device 504 may detect frequent, low amplitude, and highly variable accelerations and changes in orientation. The system may associate these variable movements with the characteristic operation of human muscles, which are not configured or capable of maintaining a fixed and unvarying position over time. For example, the mobile computing device 504 may detect accelerations that have a duration on the microsecond scale with amplitudes that vary from 0.5 mm to 1 cm over the course of 1 second or less, 2 seconds or less, or 3 seconds or less.

In another example, a variation of acceleration amplitudes and/or frequencies associated with a user holding the device 504 may be greater than 1 standard deviation, greater than 2 standard deviations, or greater than 3 standard deviations from a mean acceleration amplitude and/or mean frequency. In some cases, the variability associated with a user holding the device 504 will increase over time. This trend of increasing variability over time (e.g., over multi-second time periods), reflecting natural muscle fatigue, may also be associated with a user holding the device 504 by the method 200.

These subtle and variable movements may be sampled periodically or continuously over characteristic time periods (e.g., 1 second, 3 seconds, 10 seconds) to distinguish from vibrations that may exist in the operating environment (e.g., a manufacturing facility) and that may have different characteristic amplitudes, frequencies, and variabilities from those characteristic of the operation of human muscles. For example, while a manufacturing environment may produce background vibrations (e.g., from the operation of machines, conveyor belts, air handling equipment, moving vehicles), these are more likely to have a different amplitude (e.g., a few microns or less), a different frequency, and less variation than those caused by a human holding the device 504 because of the repeatable nature of machine operations.

In another example, the system may identify a sequence of very different movements to detect whether a user is holding the device 504. One illustration of an example sequence that may be associated with a user holding the device 504 is that of a first period of frequent, low amplitude, and highly variable accelerations and changes in orientation (as described above) that is followed by a gross movement that corresponds to a user placing the mobile computing device in a pocket or on a support surface. This second period that includes the gross movement may include a change in location on the order an arm length. Arm length distances may range from 0.5 meters to 1 meter. Arm movement velocities and/or accelerations may be associated with values on the order of 0.5 to 2 meters/second over the course of 1 second or less. A third period in this example sequence is that of a period of no acceleration and no change in orientation. This third period corresponds to the device 504 being placed on a support surface or in a pocket.

Regardless of the sensor measurements analyzed, upon determining that a user is holding the device 504, the system may present content (in this case instructions) using a visually-based content presentation system. As shown in FIG. 5A, the content is text content 508 presented on display 506.

The system may progressively provide content (in this case step by step instructions) via a presentation mode selected based on whether the device is held by a user or is disposed on a support surface. Turning to FIG. 5B, the mobile computing device 504 displays a combination of text content 516 and image content 520 to the user on the integrated display 506. The image content presents an image of a combination of medium bins 524 and small bins 528 on cart 512.

FIG. 5C illustrates an example condition in which the system automatically switches to a content presentation mode different from the content presentation mode illustrated in FIGS. 5A and 5B when the device 504 was held by the user. As shown in FIG. 5C, the device 504 has been placed on a support surface—in this case the cart 512. Using the sensor data described above, the device 504 (or a system in communication with the device 504, such as the ML application 118) determines that the user is no longer holding the device 504. Instead, the system determines that the device 504 is now oriented horizontally and/or is on a stable support surface. As described above, the system may determine the use of the support surface 512 to hold the device based on the change in orientation, and/or a reduction in position variability and/or orientation variability, a reduced frequency and/or amplitude of accelerations, reduced temperature (from being further away from a human), and the like. Responsive to this determination, the system switches to an auditory content presentation mode, thereby presenting a next instruction 532 using the speaker 510 (shown in FIG. 5A) of the device 504.

As shown in FIGS. 5A and 5B, the mobile device 504 is held in a vertical or vertically inclined orientation. This orientation is consistent with the illustration in FIG. 1C because the mobile device is oriented between +10° and +120° relative to the horizontal reference plane (i.e., the floor 214). As described above, this orientation may be detected using one or more gyroscopes integrated within the mobile computing device 504.

As also described above, the system presents visual content (e.g., text 508, 516, and image 520) using the integrated display 506 of the mobile computing device 504. The system selects a visual content presentation mode when the device 504 is vertically inclined based on the presumption that the device 504 is being held. The system selects this content presentation mode to improve visual access of a user.

FIG. 5C illustrates that the device 504 is disposed on a support surface 512 in a horizontal orientation relative to the reference plane. This orientation is consistent with the illustration presented in FIG. 1B. Based on this, the device 504 switches its content presentation mode to an auditory mode, thereby using the speaker 510 to present auditory instructions 532.

In other examples, the system may use additional sensor data to complement and/or confirm the orientation sensor data in preparation for switching between content presentation modes. For example, a temperature sensor (e.g., an infrared sensor directed toward a user when the device 504 is held in an inclined vertical orientation with the screen facing a user) may detect changes in local temperature that indicate that the mobile computing device 504 is no longer close to (i.e., held by) the user. When a temperature threshold (e.g., greater than an ambient air temperature of 70° F. or 74° F.) is exceeded, the system may select a visual display mode. Conversely, if the system detects a drop of the temperature below this threshold, the system may switch to an auditory presentation mode based on the presumption that the device 504 is further from the user and is less visible.

In another example, one or more of acceleration data and/or acceleration frequency (i.e., vibration) data may be used as described above in Section 3.1 to corroborate orientation data. In still another data, a fingerprint sensor may be used to detect disposition of the device 504 in a hand of the user and employ a visual content display mode. When a fingerprint is no longer detected, the system may switch to an auditory presentation mode.

Figure 6A:
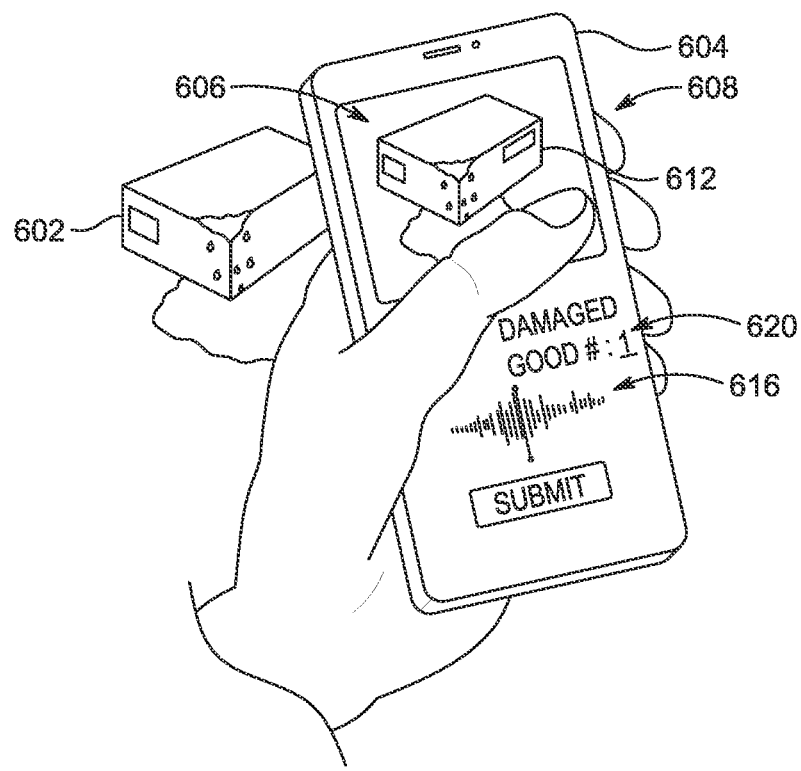
FIGS. 6A and 6B illustrates an example scenario in which a mobile computing device engages different computing applications upon detecting activation of an image capture application or identifying a feature in an image captured by the mobile computing device in accordance with one or more embodiments.
Figure 6B:
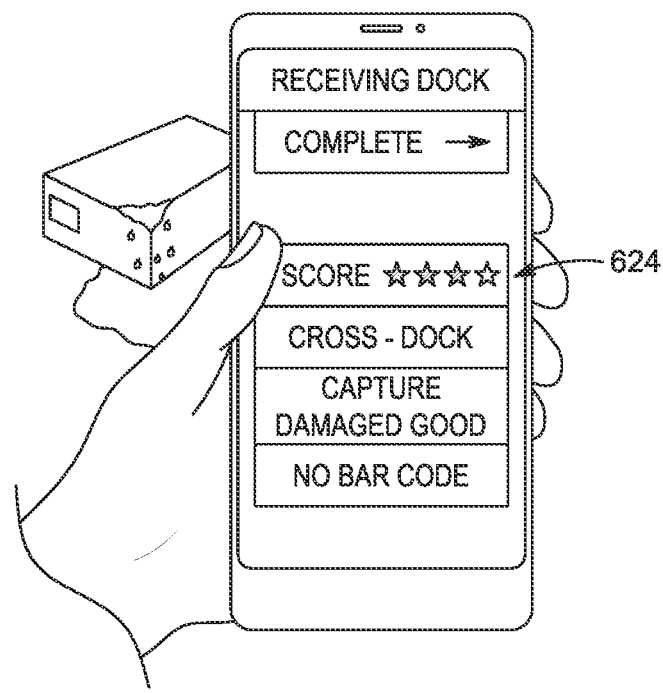

Other systems described herein may engage additional computing applications, and their corresponding functions by detecting features in images captured by the mobile computing device. FIGS. 6A and 6B illustrate one embodiment of this technique.

FIG. 6A illustrates an example scenario in which a mobile computing device 604 is used to identify a damaged product 602 (a case of leaking cola cans) at an inventory gate (e.g., a receiving dock). The reporting of a damaged product unit generally will involve documentation so that the damaged unit may be returned to a supplier for credit. In this example, documentation may include a picture of the damaged product unit, an accompanying explanation or description that comments on the conditions of the product that led to the damage, a purchase order number, a shipment tracking number, a product identifier (e.g., a SKU), and other information that may be used for logistical and/or financial aspects of a return.

Collecting the discrete and different elements of information may be time consuming and laborious, even when using the mobile computing device. This may be because of the inconvenience of switching between different computing applications on the mobile computing device 604 to, for example, record an image of the damaged product 602, record an audio file or a text file storing descriptive information related to the damaged product 602, access an inventory management application to return the product, use a bar code scanner to record a product identifier, and store all of these discrete items in a common location associated with the return.

In light of these inconveniences, embodiments of the present disclosure may analyze content in a stored image and automatically activate one or more computing applications on the mobile computing device 604 to reduce the inconveniences described above. In some examples, the system may even store an identifier with each of the discretely stored information items that associates a recorded image with a recorded sound file. For example, the system may associate one or more of a bar code scanner result, an inventory management system transaction identifier, a return material authorization (RMA) identifier, and the like, with stored images.

For example, the mobile computing device 604, with integrated display 608, may capture in image 612 of the damaged product 602 using an image capture application 606 and a camera (not shown, disposed on a side of the device 604 opposite the display 608).

The device 604 (or a system in communication with the device, such as ML application 118) may analyze the captured image 612 and determine that additional, related information will be collected using a computing application different from the image capture application 606. In this example, the device 604 determines that an audio recording application 616 is to be activated responsive to the analysis of the captured image 612. Upon activating the audio recording application 616, the user may record descriptive comments and observations of the damaged product 602. While not shown, the system may also activate any of the other computing applications (e.g., bar code scanner, RMA application, image annotation application, voice command application, financial applications, inventory management systems) using the techniques described herein.

The system may also generate an association between the audio recording file and the captured image so that these two discrete content items, generated by and stored by different computing applications, may be linked together. In this case, the identifier 620 ("Damaged Good #: 1") is associated with both the audio recording 616 and the captured image 612.

In some examples, the system may activate the audio recording application (or other application) by analyzing the captured image 612 and identifying within the captured image 612 one or more features that act as triggers for the audio recording application. In one example, the analysis of the image is performed using a trained machine learning model to identify triggering features. In the example presented in FIGS. 6A and 6B, the system may be provided with a training set of images that include triggering features and are accompanied by data collected using another application. For example, the training set may include individually stored images of damaged goods, each of which is associated with an accompanying audio recording, text file, voice command activation file, RMA application file, or the like. The machine learning model may be trained to associate images of damaged goods with activation of one or more of these applications. With this training, the system may then analyze a newly captured image and, using the training, activate another application accordingly without any express user input. In some examples, the training may be provided in subsets so that particular product types and/or particular damage types may be associated with the activation of different applications. For example, the leaking cola case 602 that is identified in the captured image 612 may be associated with activation of the audio recording application 616. In another example, a captured image of a torn unit of sale package (e.g., a blister pack configured to be placed on a checkout aisle hanging display) may be associated with activation of a supplier RMA application or a barcode scanning application.

For examples in which an audio file is captured, the system may convert the audio file to text and analyze the text using natural language processing techniques. This may enable storage of an accompanying transcript (identified using the common identifier 620), semantic analysis of the file, as well as any other analysis.

In other examples, the system may activate the other application (in addition to the image capture application) based on a similarity analysis with reference images exceeding a similarity threshold. For example, reference images of damaged cola cases may be analyzed by image processing techniques and converted into feature vectors. Vector values associated with leaks and damaged cartons may be linked to activation of the other application (e.g., audio recording application 616). When a new image (i.e., image 612) is captures, this new image may be vectorized and the vector compared to the vectors of the reference images using a similarity analysis (e.g., cosine similarity). If the similarity analysis is above a threshold value (e.g., above 0.5), then the system may determine that the new image contains features similar to images for which the audio recording application was activated, and consequently activate the audio recording application.

FIG. 6B illustrates an additional application activated in response to the analysis of the image 612. The application 624 is a defect reporting application that is activated in responses to the system analyzing the image 612 and detecting the damage. In this case, the defect reporting application 624 allows a user to enter text-based defect characterizations (e.g., "No Bar Code"), as well as a defect severity score, among other information.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
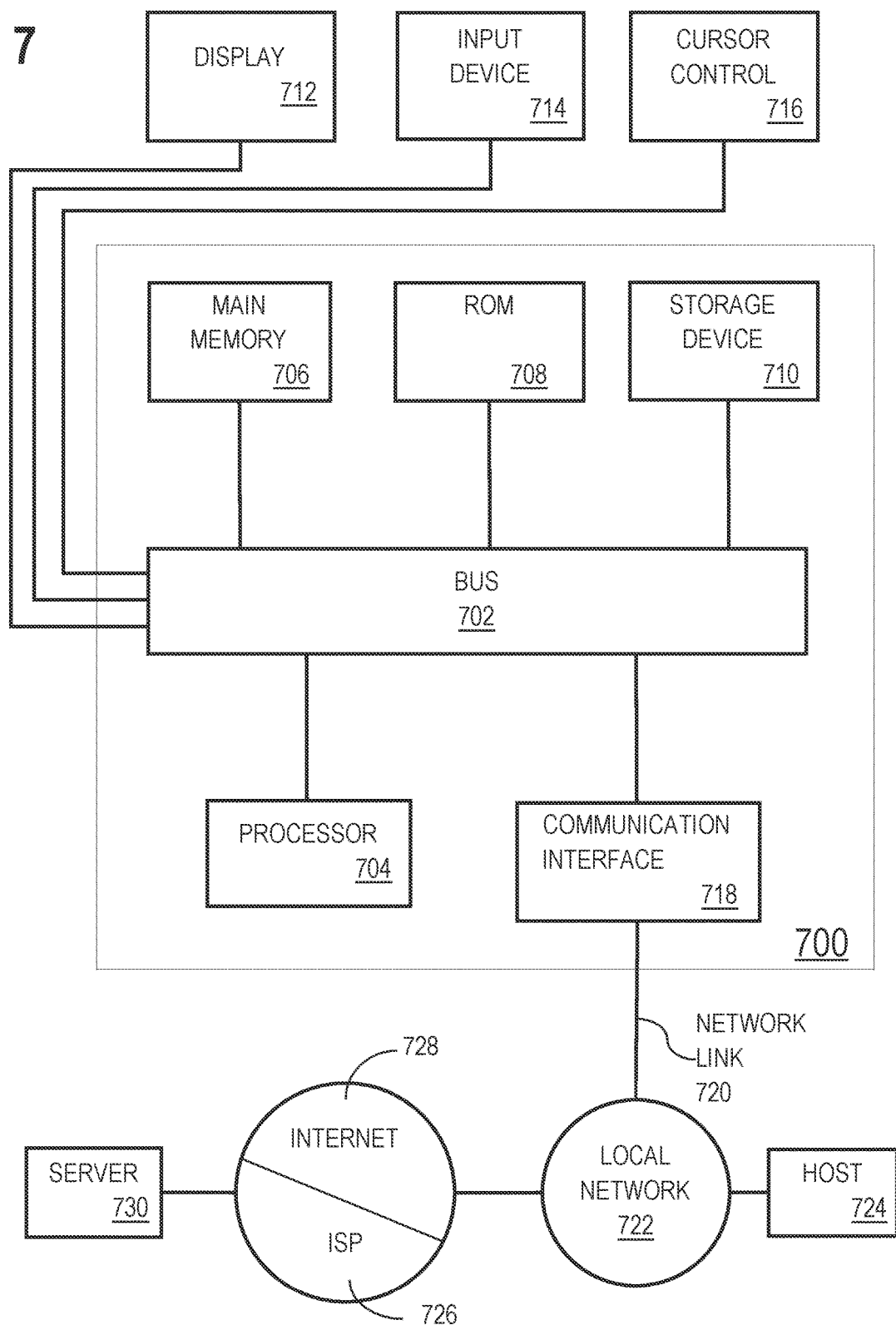
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
   detecting that an application of a mobile device is being executed while the mobile device is in motion;
   selecting a first visual content presentation mode for presenting a set of content based on the application being executed while the mobile device is in motion;
   presenting a first portion of the set of content as text data in the first visual content presentation mode;
   subsequent to presenting the first portion of the set of content as text data in the first visual content presentation mode, detecting a cessation of motion of the mobile device;
   responsive to detecting the cessation of motion of the mobile device:
      reconfiguring the application from presenting the set of content in the first visual content presentation mode to presenting at least a second portion of the set of content in an auditory content presentation mode;
      presenting the second portion of the set of content as audio data in the auditory content presentation mode,
      wherein the first portion of the set of content and the second portion of the set of content are sequentially related.

2. The media of claim 1, wherein the motion associated with the first visual content presentation mode corresponds to the mobile device being held by a user.

3. The media of claim 1, wherein the operations further comprise:
   detecting, based on one or more vibration parameters, at least one of: the motion or the cessation of motion,
   wherein the one or more vibration parameters comprise at least one of:
      a frequency of vibration;
      a range of vibration amplitudes;
      a variation of the frequency of vibration during a time period; or
      a variation in the amplitudes of vibration during the time period.

4. The media of claim 1, wherein the motion of the mobile device is associated with a vertical orientation of the mobile device.

5. The media of claim 1, wherein the cessation of motion corresponds to the mobile device being supported by a support surface.

6. The media of claim 5, wherein the cessation of motion is associated with one or more of:
   a variation of a frequency of vibration during a time period that is below a first threshold variation; or
   a variation in amplitudes of vibration during the time period that is below a second threshold variation.

7. The media of claim 1,
   wherein presenting the first portion of the set of content as text data in the first visual content presentation mode comprises: presenting a first portion of a set of instructions as text data;
   wherein presenting the second portion of the set of content as audio data in the auditory content presentation mode comprises: presenting a second portion of the set of instructions as audio data.

8. The media of claim 1, wherein the operations further comprise:
   further responsive to detecting the cessation of motion of the mobile device:
      initiating a second visual content presentation mode for the application,
      presenting a third portion of the set of content in the second visual content presentation mode,
      wherein the first visual content presentation mode comprises a first level of detail, and wherein the second visual content presentation mode comprises a second level of detail,
      wherein the second level of detail comprises less detail than the first level of detail.

9. The media of claim 1, wherein the operations further comprise:
   detecting, based on image data captured by an image sensor of the mobile device, at least one of:
      the mobile device being in motion, or the cessation of motion.

10. The media of claim 1, wherein the operations further comprise:
    detecting the cessation of motion of the mobile device based on a change in at least one of:
       orientation, orientation variability, position, position variability, acceleration, frequency of accelerations, or amplitude of accelerations.

11. The media of claim 1, wherein presenting the first portion of the set of content as text data in the first visual content presentation mode comprises presenting a first instruction to a user, and wherein presenting the second portion of the set of content as audio data in the auditory content presentation mode comprises presenting a second instruction to the user.

12. The media of claim 1, wherein the operations further comprise:
    subsequent to reconfiguring the application from presenting the set of content in the first visual content presentation mode to presenting at least the portion of the set of content in
    the auditory content presentation mode, detecting a commencement of motion of the mobile device; and
    responsive to detecting the commencement of motion of the mobile device:
       initiating a visual content presentation mode for the application, and
       presenting a third set of content in the visual content presentation mode.

13. The media of claim 1, wherein detecting the cessation of motion of the mobile device comprises determining that the mobile device has transitioned from being in motion to not being in motion.

14. One or more non-transitory computer-readable media storing instructions, which when executed by one or more hardware processors, cause performance of operations comprising:
- receiving a first sensor input corresponding to a first orientation of a mobile computing device;
- responsive to the first sensor input, initiating a first visual content presentation mode of an application for presenting a set of content to a user;
- presenting a first portion of the set of content as text data in the first visual content presentation mode;
- subsequent to presenting the first portion of the set of content as text data in the first visual content presentation mode, receiving a second sensor input corresponding to a second orientation of the mobile computing device; and
- detecting, based on the second sensor input, a cessation of motion of the mobile computing device;
- responsive to detecting the cessation of motion of the mobile computing device:
  - reconfiguring the application from presenting the set of content in the first visual content presentation mode to presenting at least a second portion of the set of content in an auditory content presentation mode;
  - presenting the second portion of the set of content as audio data in the auditory content presentation mode, wherein the first portion of the set of content and the second portion of the set of content are sequentially related.

15. The media of claim 14, wherein:
the first orientation comprises an inclined orientation of the mobile computing device having an inclination relative to a horizontal reference plane of from 10 degrees to 120 degrees.

16. The media of claim 14, wherein the second orientation comprises a horizontal orientation of the mobile computing device relative to a horizontal reference plane of at least 10 degrees.

17. The media of claim 14,
wherein the first sensor input comprises a first plurality of accelerometer inputs indicating a first frequency of accelerations greater than a threshold; or
wherein the second sensor input comprises a second plurality of accelerometer inputs indicating a second frequency of accelerations less than the threshold.

18. The media of claim 14, wherein the first sensor input comprises detecting a fingerprint via a fingerprint sensor.

19. The media of claim 14, wherein the cessation of motion is associated with one or more of:
- a variation of a frequency of vibration during a time period that is below a first threshold variation; or
- a variation in amplitudes of vibration during the time period that is below a second threshold variation.

20. The media of claim 14,
wherein presenting the first portion of the set of content as text data in the first visual content presentation mode comprises: presenting a first portion of a set of instructions as text data;
wherein presenting the second portion of the set of content as audio data in the auditory content presentation mode comprises: presenting a second portion of the set of instructions as audio data.

21. The media of claim 20, further comprising:
further responsive to detecting the cessation of motion of the mobile computing device:
initiating a second visual content presentation mode for the application,
presenting a third portion of the set of content in the second visual content presentation mode,
wherein the first visual content presentation mode comprises a first level of detail, and wherein the second visual content presentation mode comprises a second level of detail,
wherein the second level of detail comprises less detail than the first level of detail.

22. A mobile device, comprising:
at least one hardware processor;
wherein the mobile device is configured to execute operations, using the at least one hardware processor, the operations comprising:
- detecting that an application of the mobile device is being executed while the mobile device is in motion;
- selecting a first visual content presentation mode for presenting a set of content based on the application being executed while the mobile device is in motion;
- presenting a first portion of the set of content as text data in the first visual content presentation mode;
- subsequent to presenting the first portion of the set of content as text data in the first visual content presentation mode, detecting a cessation of motion of the mobile device;
- responsive to detecting the cessation of motion of the mobile device:
  - reconfiguring the application from presenting the set of content in the first visual content presentation mode to presenting at least a second portion of the set of content in an auditory content presentation mode;
  - presenting the second portion of the set of content as audio data in the auditory content presentation mode, wherein the first portion of the set of content and the second portion of the set of content are sequentially related.

* * * * *